US011331702B2

(12) United States Patent
Iai et al.

(10) Patent No.: US 11,331,702 B2
(45) Date of Patent: May 17, 2022

(54) COLORED STAINLESS STEEL PLATE AND COLORED STAINLESS STEEL COIL

(71) Applicant: ABEL CO., LTD., Yao (JP)

(72) Inventors: Hideki Iai, Yao (JP); Kosuke Iai, Yao (JP); Yoshikazu Aoki, Yao (JP)

(73) Assignee: ABEL CO., LTD., Yao (JP)

( * ) Notice: Subject to any disclaimer, the term of this patent is extended or adjusted under 35 U.S.C. 154(b) by 66 days.

(21) Appl. No.: 16/313,490

(22) PCT Filed: Jan. 31, 2018

(86) PCT No.: PCT/JP2018/003194
§ 371 (c)(1),
(2) Date: Dec. 27, 2018

(87) PCT Pub. No.: WO2018/143267
PCT Pub. Date: Aug. 9, 2018

(65) Prior Publication Data
US 2019/0160500 A1    May 30, 2019

(30) Foreign Application Priority Data
Jan. 31, 2017    (JP) .............................. JP2017-015643

(51) Int. Cl.
*B21B 3/02*    (2006.01)
*B21B 1/28*    (2006.01)
(Continued)

(52) U.S. Cl.
CPC .................. *B21B 3/02* (2013.01); *B21B 1/22* (2013.01); *B21B 1/28* (2013.01); *B32B 15/04* (2013.01);
(Continued)

(58) Field of Classification Search
CPC .... B21B 1/22; B21B 1/28; B21B 3/02; C25D 11/00; C25D 11/34; C25D 11/38;
(Continued)

(56) References Cited

U.S. PATENT DOCUMENTS 4,518,467 A * 5/1985 Mason ...................... C25D 5/48
205/111
4,579,606 A * 4/1986 Mizunuma ............ F24S 70/225
428/682
(Continued)

FOREIGN PATENT DOCUMENTS

JP    S52-32621 B2    8/1977
JP    H02-305974 A    12/1990
(Continued)

OTHER PUBLICATIONS

Machine Translation, Nishimura et al., JP 2004-346364, Dec. 2004. (Year: 2004).*

*Primary Examiner* — Michael E. La Villa
(74) *Attorney, Agent, or Firm* — Rabin & Berdo, P.C.

(57) ABSTRACT

A color coating layer is formed on the surface of a stainless steel plate by a chemical coloring method or an electrolytic coloring method. Thereafter, a colored stainless steel plate having the color coating layer is cold-rolled, the thickness of the color coating layer is adjusted to between 0.05 μm and 1.0 μm, and an entire plate thickness is adjusted to 0.5 mm or less. By the cold rolling a Vickers hardness Hv is between 250 and 550 to form a deformed band. As surface roughness, an arithmetic average roughness Ra is adjusted to between 0.05 μm and 5.0 μm. In this manner, the strength and rigidity of a thin colored stainless steel plate can be secured, and a color stainless steel plate and a colored stainless steel coil which do not easily cause galling and are excellent in press moldability can be obtained.

5 Claims, 10 Drawing Sheets

(51) Int. Cl.

| | | |
|---|---|---|
| *C25D 11/38* | (2006.01) | |
| *C25D 11/34* | (2006.01) | |
| *B32B 15/01* | (2006.01) | |
| *C23C 22/24* | (2006.01) | |
| *B21B 1/22* | (2006.01) | |
| *C25D 11/00* | (2006.01) | |
| *C25D 9/06* | (2006.01) | |
| *C25D 9/10* | (2006.01) | |
| *C21D 7/04* | (2006.01) | |
| *C21D 7/02* | (2006.01) | |
| *C23C 22/82* | (2006.01) | |
| *B32B 15/04* | (2006.01) | |
| *B32B 15/18* | (2006.01) | |
| *C23C 30/00* | (2006.01) | |
| *C23C 18/22* | (2006.01) | |
| *C23C 18/16* | (2006.01) | |
| *C23C 18/54* | (2006.01) | |
| *C25D 11/18* | (2006.01) | |
| *C23C 22/28* | (2006.01) | |

(52) U.S. Cl.
CPC ............ *B32B 15/043* (2013.01); *B32B 15/18* (2013.01); *C21D 7/02* (2013.01); *C21D 7/04* (2013.01); *C23C 18/16* (2013.01); *C23C 18/1689* (2013.01); *C23C 18/22* (2013.01); *C23C 18/54* (2013.01); *C23C 22/24* (2013.01); *C23C 22/28* (2013.01); *C23C 22/82* (2013.01); *C23C 30/00* (2013.01); *C23C 30/005* (2013.01); *C25D 9/06* (2013.01); *C25D 9/10* (2013.01); *C25D 11/00* (2013.01); *C25D 11/18* (2013.01); *C25D 11/34* (2013.01); *C25D 11/38* (2013.01); *Y10T 428/1266* (2015.01); *Y10T 428/12611* (2015.01); *Y10T 428/12618* (2015.01); *Y10T 428/12667* (2015.01); *Y10T 428/12951* (2015.01); *Y10T 428/12972* (2015.01); *Y10T 428/12979* (2015.01); *Y10T 428/12993* (2015.01); *Y10T 428/26* (2015.01); *Y10T 428/265* (2015.01)

(58) Field of Classification Search
CPC . C25D 11/18; C25D 9/06; C25D 9/10; C21D 7/04; C21D 7/02; C23C 18/16; C23C 18/1689; C23C 18/22; C23C 18/54; C23C 22/24; C23C 22/82; C23C 30/00; C23C 30/005; C23C 22/28; Y10T 428/12611; Y10T 428/12618; Y10T 428/1266; Y10T 428/12667; Y10T 428/12951; Y10T 428/12972; Y10T 428/12979; Y10T 428/12993; Y10T 428/26; Y10T 428/265; B32B 15/04; B32B 15/043; B32B 15/18
See application file for complete search history.

(56) References Cited

U.S. PATENT DOCUMENTS

| | | | | |
|---|---|---|---|---|
| 2007/0259203 | A1* | 11/2007 | Buecher | ............... C23C 2/26 428/687 |
| 2009/0202380 | A1* | 8/2009 | Conrad | ............... C22C 38/02 420/49 |
| 2010/0159237 | A1* | 6/2010 | Watanabe | ......... B29C 66/91445 428/339 |
| 2011/0097973 | A1* | 4/2011 | Jin | ......................... B21B 45/06 451/28 |

FOREIGN PATENT DOCUMENTS

| | | |
|---|---|---|
| JP | H06-299394 A | 10/1994 |
| JP | H10-60663 A | 3/1998 |
| JP | 2000-087259 A | 3/2000 |
| JP | 2004-060009 A | 2/2004 |
| JP | 2004-346364 A | 12/2004 |

\* cited by examiner

41: OUTER TANK
42: LINING
43: OXIDIZING SOLUTION
45: STAINLESS STEEL PLATE

41: OUTER TANK
42: LINING
43: OXIDIZING SOLUTION
44: PLATINUM ELECTRODE
45: STAINLESS STEEL PLATE
46: DC POWER SUPPLY

COLORED STAINLESS STEEL PLATE AND COLORED STAINLESS STEEL COIL

TECHNICAL FIELD

This invention relates to a colored stainless steel plate and a colored stainless steel coil manufactured by a chemical coloring method or an electrolytic coloring method (each of the methods is performed in a batch) or a coil coloring method (continuous coloring method) and a method of manufacturing the colored stainless steel plate and the colored stainless steel coil. In particular, the invention relates to a stainless cold-rolled (cold strip) steel plate and a cold-rolled steel coil which are excellent in galling resistance and moldability in press molding and have high hardness in molding and a method of manufacturing the stainless cold-rolled (cold-rolling) steel plate and the cold-rolled steel coil.

BACKGROUND ART

In this specification, a steel strip means a long plate-like steel body having a length in the longitudinal direction larger than a length in the width direction. The steel plate means a cut plate cut from a steel stripin a desired length. Furthermore, a coil means a thing spirally rolled up from a steel strip.

As shown in FIG. 10, in a stainless steel (colored stainless steel plate) 100, an oxide film (color coating layer) 102 is formed on the surface of a stainless base material (stainless steel plate) 101. The oxide film (color coating layer) 102 functions as an optical interference film. The stainless steel (color stainless steel plate) 100 exhibits various colors.

More specifically, incident light L0 to the stainless steel 100 is divided into reflected light L1 reflected on the surface of the oxide layer 102 and reflected light L2 reflected on the surface of the stainless base material 101. The reflected lights L1 and L2 of two types interfere with each other due to the characteristics of wave to enhance light of a color depending on the thickness of the oxide layer 102.

As representative examples of a coloring method for stainless steel, for example, a chemical coloring method disclosed in Patent Literature 1 and, for example, an electrolytic coloring method disclosed in Patent Literature 2 are given.

In a stainless steel plate manufactured by the chemical coloring method or the electrolytic coloring method, a color coating layer contains an (hydro) oxide of chromium as a main component. The color coating layer has a small thickness of 1.5 µm at most. Due to the interference effect of light depending on the thickness of the color coating layer and the color of the color coating layer itself, the colored stainless steel plate can create various colors such as bronze, blue, gold, red, and green.

For this reason, depending on required designs, the colored stainless steel plates have been worked into molded articles having various shapes and have been in use.

Such colored stainless steel plates are popularly used in the filed of building materials for interiors, exteriors, or the like related to building materials. The plate thicknesses of the steel plates are 0.5 mm or more in many cases. However, in recent years, in a functional member utilizing optical characteristics or a small molded article of a colored stainless steel plate reflecting the trend of miniaturization, a frequency in use of a thin plate having a thickness of 0.5 mm or less increases. For this reason, cases in which molded articles after molding require rigidity have increased.

The stainless steel plate, contains a 2B material, a 2D material, a BA material, and the like which become soft by annealing. However, a press molded article of a colored stainless steel plate having a small thickness as described above is easily deformed. For this reason, the colored stainless steel plate must be increased in strength.

When a molded article of a high-strength colored stainless steel plate is required in the field of building materials, in terms of holding a colored beautiful surface, a thermal refining material of a stainless steel plate the surface hardness of which is enhanced by cold-rolling is used. A method in which, after molding such as press working is performed to the thermal refining material of the stainless steel plate, chemical coloring or electrolytic coloring is finally performed is used.

In the cold rolling, as is apparent from FIG. 11, a draft (rolling reduction) increases and Vickers hardness increases even in any stainless steel plate. Even though rolling is performed, a ferritic stainless steel plate such as SUS443CT 2B does not become hard easily more than austenite stainless steel plates such as SUS304 2B.

Incidentally, in an application of a small thickness of 0.5 mm or less, in particular, in an application oriented to functionality such as optical characteristics, the colored stainless steel plate has been required to have good moldability and workability and high galling resistance and to form a molded article having high rigidity in many cases. The galling means seizure occurring due to a contact between a press mold such as a die and a base material, and, in particular, easily occur due to a contact between a base material roughly deformed and a die.

Stainless steel ordinary has a low heat conductivity. For this reason, seizure between the stainless steel and a press mold easily occurs in press molding. Wastage of the mold causes an increase in cost. In order to prevent the seizure, a countermeasure which uses a chlorine-based or sulfurous extreme-pressure agent as an extreme-pressure agent in press forming oil or a countermeasure which increases the viscosity of press forming oil is taken.

For example, a technique for a metal thin plate disclosed in Patent Literature 3 is to form an Fe—Ni—O coating on at least one surface of the metal plate. Commonly in aluminum, stainless, and steel thin films, the object of the technique is to develop a suitable surface coating of a metal plate to obtain a metal thin plate having, in particular, good press moldability, good spot weldability, good adhesion properties, and good chemical processability. Desirably, an Fe—Ni—O coating in which a deposition amount of coating falls within the range of 10 mg/m$^2$ or more to 1500 mg/m$^2$ or less in terms of a total amount of metal element in the coating, a ratio of an Fe content (wt %) to the sum of an Fe content (wt %) and an Ni content (wt %) falls within the range of 0.004 or more to 0.9 or less, and an oxygen content falls within the range of 0.5 wt % or more to 10 wt % or less is formed. At this time, in order to improve the galling resistance and press moldability of the metal thin plate, a lubricant (press forming oil) having high viscosity must be used. In addition, after the molding, the high-viscosity press forming oil must be cleaned up.

A technique of a ferritic stainless steel plate disclosed in Patent Literature 4 is to provide a ferritic stainless steel plate which is very excellent in deep drawing characteristics. Very strict press working can be applied to the ferritic stainless steel plate. In order to achieve this object, the stainless steel plate has a surface coating having a friction coefficient µ of 0.21 or less. An average value r of a Lankford r value in consideration of anisotropy is 1.9 or more. Furthermore, the ferritic stainless steel plate has a limiting drawing ratio of 2.50 or more and is excellent in press moldability. This stainless steel plate contains specific amounts of C, N, Cr, Si, Mn, P, S, and Al and contains at least one of Ti, Nb, and Zr. The remaining components are iron and unavoidable impurities. As needed, the stainless steel plate may contain at least one of Mg, B, Mo, Ni, Cu, and V. In addition, the technique of the ferritic stainless steel plate is applied at a specific cold-rolling rate by a specific combination of cold rolling and annealing after hot rolling is performed. Note that solid lubricant may be able to be formed to improve galling resistance and press moldability.

PRIOR ART LITERATURE

Patent Literature

Patent Literature 1: Japanese published examined application No. 52-32621
Patent Literature 2: Japanese Unexamined Patent Application Publication No. 06-299394
Patent Literature 3: Japanese Unexamined Patent Application Publication No. 10-60663
Patent Literature 4: Japanese Unexamined Patent Application Publication No. 2004-60009

SUMMARY OF THE INVENTION

Problem to be Solved by the Invention

Incidentally, a cold-rolled stainless steel plate having high strength is ordinarily poor in moldability. In particular, as the strength increases in press molding, machining cracks and galling (seizure) more easily occur. More specifically, a thermal refining material such as ½H or ¾H of SUS304 having strength and rigidity is poor in press moldability and easily causes galling disadvantageously.

However, of the countermeasures by the press forming oil, the former countermeasure, i.e., the countermeasure using a chlorine-based or sulfurous extreme-pressure agent as an extreme-pressure agent in press forming oil poses an environmental problem in which generates dioxin when waste press forming oil is burned, or deteriorates resistance to corrosion of a color coating layer disadvantageously. In addition, the latter countermeasure, i.e., the countermeasure which improves the viscosity of the press forming oil considerably increases costs in degreasing step after press molding.

Thus, a colored stainless steel plate and steel coil which have high moldability, rarely cause galling, and high strength in molded articles in terms of shape freezing property even though a non-chlorine extreme-pressure agent or a low-viscosity press forming oil is used are desired to be produced.

On the other hand, in the field of building materials, chemical coloring or electrolytic coloring is performed to a molded article obtained after press molding. For this reason, the molded article cannot be continuously colored. Thus, a certain number of molded articles must be colored in a batch process. Therefore, productivity is also disadvantageously deteriorated.

This invention has been made to solve the above conventional problems. It is an object of the invention to obtain a colored stainless cold-rolled steel plate and a steel coil which have high moldability, rarely cause galling, have high strength in molded articles in terms of shape freezing property, and have high productivity and a method of manufacturing the same.

Means for Solving the Problem

As a result of dedicated examination from the above viewpoint, the present inventor performed cold-rolling to a stainless steel plate or a stainless steel strip (uncut colored stainless steel plate obtained before a colored stainless steel plate is cut out) which is colored in advance, held surface Vickers hardness Hv of the stainless steel plate within the range of 250 or more to 550 or less, prepared a color layer having a thickness of 0.05 μm or more to 1.0 μm or less. The present inventor found that the stainless steel plate was improved in press moldability and seizure resistance in comparison with a stainless steel plate obtained such that cold-rolling was performed to a simple pure stainless steel plate free from a color coating layer to improve Vickers hardness and coloring was performed.

The present invention has been made based on the knowledge.

More specifically, the colored stainless steel plate according to the present invention has a color coating layer having a thickness of 0.05 μm or more to 1.0 μm or less on a stainless steel plate surface and has a deformed band which is formed on a surface of the color coating layer by cold rolling and on which an enlarged image obtained by an optical microscope or a scanning electron microscope is observed as a wave-like striped pattern.

The colored stainless steel plate according to the present invention has a Vickers hardness Hv of 250 or more to 550 or less on the surface of the color coating layer.

The colored stainless steel plate according to the present invention has surface roughness in which an arithmetic average roughness Ha on the surface of the color coating layer is 0.05 μm or more to 5.0 μm or less.

A colored stainless steel coil according to the present invention is obtained by winding any one of the colored stainless steel plates described above in the form of a coil.

A method of manufacturing a colored stainless steel plate according to the present invention includes a coloring step of forming a color coating layer on a stainless steel plate surface by a chemical coloring method, an electrolytic coloring method, or a continuous coloring method, and a rolling step of cold-rolling a colored stainless steel plate on which a color coating layer is formed in the coloring step and preparing the color coating layer having a thickness of 0.05 μm or more to 1.0 μm or less.

A method of manufacturing a colored stainless steel coil according to the present invention includes a coloring step of a color coating layer on a stainless steel plate surface by a chemical coloring method, an electrolytic coloring method, or a continuous coloring method, a cold-rolling step of cold-rolling the colored stainless steel plate on which the color coating layer is formed by the coloring step to prepare the color coating layer having a thickness of a thickness of 0.05 μm or more to 1.0 μm or less and a surface arithmetic average roughness Ra of 0.05 μm or more to 5.0 μm or less, and a winding step of winding the colored stainless steel plate cold-rolled in the cold-rolling step in the form of a coil to obtain a colored stainless steel coil.

Furthermore, the colored stainless steel plate according to the present invention is a colored stainless steel plate including a stainless steel plate at least one main surface of which should be colored and a color coating layer formed on the main surface to be colored of the stainless steel plate, wherein the color stainless steel plate is cold-rolled to control a surface hardness, a thickness of the color coating layer on at least one main surface is controlled, and, by the cold rolling, a fine unevenness to be an oil sump of press forming oil is formed in at least one main surface having the color coating layer of the color stainless steel plate. As a matter of course, even though the color coating layer is formed on each of both the main surfaces of the stainless steel plate, the purpose of the present application is not impaired.

More specifically, the coarsening of the colored stainless steel plate according to the present invention is performed such that a deformed band formed on the colored stainless steel plate by rolling deformation of the cold rolling is generated to produce fine steps on at least one main surface having the color coating layer on the color stainless steel plate.

Furthermore, in the stainless steel plate according to the present invention, in addition to the fine unevenness on the deformed band, coarsening of the main surface having the color layer by the cold rolling using a roll having a coarsened surface is performed to reinforce oil sumps of press forming oil in pressing.

A cause of improving effect by the above knowledge may be obtained by improving seizure resistance with a mold in press molding by a color coating layer having a thickness of 0.05 μm or more. Furthermore, the colored stainless steel plate is cold-rolled thereafter, as shown in FIG. 1 (see FIG. 9B), a fine unevenness caused by a deformed band 5 formed by cold rolling is formed on a surface 3 of the color coating layer. Oil drops of press lubricant reserved in oil sumps 7 obtained by the fine unevenness may prevent oil shortage of the press lubricant in press working to bring a lubricant effect in press working.

Furthermore, the following knowledge is also found. More specifically, it is found that, when roll surface roughness in cold rolling of a colored stainless steel plate is controlled to adjust the arithmetic average roughness Ra on the surface 3 of the color coating layer of the stainless steel plate to a thickness of 0.05 μm or more to 5.0 μm or less, these characteristics are further improved.

The following knowledge is also found. More specifically, after the cold rolling of the colored stainless steel plate, when a Vickers hardness Hv in the color coating layer is 250 or more to 550 or less, a molded article has high strength, and press workability of the stainless steel is improved.

According to this knowledge, in comparison with a conventional method, i.e., a method of performing press working to a stainless steel plate or a stainless steel strip having strength improved by cold rolling (uncut stainless steel plate obtained before a stainless steel plate is cut out) and applying chemical coloring or electrolytic coloring to the press product, a stainless steel plate or a stainless steel strip obtained by cold-rolling a color stainless steel plate or a color stainless steel strip (uncut color stainless steel plate obtained before a color stainless steel plate is cut out) to control a surface hardness and a thickness of a color layer is excellent in press moldability and galling resistance. When the steel plate or the steel strip is used, the productivity of a molded article having high rigidity in a color stainless steel plate including a coloring process step or a color stainless strip is spectacularly improved.

In the stainless steel plate or the stainless steel strip according to the invention, reasons for limiting will be described below.

As a coloring method of a stainless steel plate which can be applied in the present invention, as described above, a chemical coloring method or an electrolytic coloring method is given.

FIGS. 9A and 9B show an observation result (FIG. 9A) of a surface of a colored stainless steel plate of an SUS304BA material and an observation result (FIG. 9B) of a surface obtained by performing 50% cold rolling to the colored stainless steel plate. FIGS. 9A and 9B are enlarged images a surface 3 of a color coating layer of a colored stainless steel plate by a scanning electron microscope (Scanning Electron Microscope; SEM). The same enlarged images can also be obtained by an optical microscope. As shown in FIG. 9B, an enlarged image of a deformed band is observed as a wave-like striped pattern. According to the enlarged image, it is found that a fine unevenness caused by a deformed band 5 is formed by cold rolling on the surface 3 of the color coating layer shown in FIG. 1. When a cold-rolling rate of the color stainless steel plate is less than 10%, as shown in FIG. 9B, no unevenness is observed on the surface 3 of the color coating layer, and press moldability is low. A cold-rolling rate of 10% or more is preferable for press moldability. In contrast to this, when a coloring process is performed after cold rolling to a stainless steel plate, probably due to a chemical coloring reaction or an electrolytic coloring reaction, no fine unevenness on the surface 3 of the color coating layer is observed.

The thickness of the color coating layer of the colored stainless steel plate or the colored stainless steel strip obtained by cold rolling preferably falls within the range of 0.05 μm or more to 1 μm or less.

More specifically, when the thickness of the color coating layer is less than 0.05 μm, galling easily occurs in press working.

When the thickness of the color coating layer exceeds 1.0 μm, adhesion between the color coating layer and a stainless steel plate material is deteriorated, and galling easily occurs in press working.

Thus, the thickness of the color coating layer depending on a required color is selected within the range of 0.05 μm or more to 1 μm or less. With this selection, a colored stainless steel plate or a colored stainless steel strip having good moldability in press working and reducing occurrence of galling can be provided.

The Vickers hardness Hv on the surface of the color coating layer of the colored stainless steel plate or the colored stainless steel strip preferably falls within the range of 250 or more to 550 or less.

The Vickers hardness Hv on the surface of the color coating layer of the colored stainless steel plate or the colored stainless steel strip is less than 250, the rigidity of the molded article obtained by press molding or the like is low. In addition, the Vickers hardness Hv is equal to or higher than 250, the strength of a molded article increases as the hardness increases. However, when the Vickers hardness Hv exceeds 550, press workability of the stainless steel is considerably deteriorated.

Thus, the Vickers hardness Hv on the surface of the color coating layer preferably falls within the range of 250 or more to 550 or less.

Incidentally, when the colored stainless steel plate is dully finished, a roll surface roughness of a final pass is almost equal to a surface roughness of a dull-finished colored stainless steel plate. This is because the roll is switched to a dull roll in only the final pass of rolling, and the roll surface is transferred onto the colored stainless steel plate. Therefore, when the surface roughness of the roll in cold-rolling is changed to control the surface roughness of the cold-rolled colored stainless steel plate or colored stainless steel strip, oil shortage of press lubricant may be further prevented. In this case, press moldability should be further improved. When the arithmetic average roughness Ra is less than 0.05 μm, the press moldability is poor. In addition, when the arithmetic average roughness Ra exceeds 5 μm, press cracks caused by the roughness easily occur. When the arithmetic average roughness Ra falls within the range of 0.05 μm or more to 5.0 μm or less, press lubricant is easily held on the color stainless steel plate surface in pressing. As a result, a lubricant effect is exerted to improve press moldability and galling resistance.

As long as the stainless steel plate, any stainless steel plate including an austenite stainless steel plate or a ferritic stainless steel plate which can be colored by chemical coloring or electrolytic coloring is used as the stainless steel plate, the effect of the present invention is not spoiled. For this reason, the steel type is not limited to a specific steel type. As surface finishing of a stainless steel plate before coloring, in addition to a BA material or a 2B material, a mirror-finished material, a hair-line-finished material, a polished material, and or like is given. Since these materials are commonly valid, the material is not regulated in the invention of the present application. Furthermore, although the austenite stainless steel plate includes a nonmagnetic steel which is not easily magnetized even in cold rolling, the austenite stainless steel plate is also included in the scope of the invention of the present application.

The stainless steel plate and the stainless steel strip are mainly explained. However, when a color coating layer can be prepared by cold rolling to have a thickness falling within the range of 0.05 μm or more to 1.0 μm or less, a stainless steel material having another shape may be used. This stainless steel material is also included in the scope of the invention of the present application.

Effect of the Invention

According to the invention, by using a steel plate or a steel band which is more excellent in press moldability and galling resistance, a cold-rolled color stainless steel plate and a cold-rolled color stainless steel coil which can spectacularly improve the productivity of a molded article having high rigidity of a color stainless steel plate including a coloring step and a method of manufacturing the same can be obtained.

The above object, other objects, characteristics, and advantages of the invention will be further clarified by the explanation of the following detailed description of embodiments made with reference to the drawings.

BRIEF DESCRIPTION OF THE DRAWINGS

FIGS. 4A and 4B are diagrams showing an example of a device used in a chemical coloring step and a hard film processing step of the colored stainless steel plate according to the invention, in which FIG. 4A is a diagram showing an example of a chemical coloring device which dips a stainless steel plate to color the stainless steel plate and FIG. 4B is a diagram showing a hard film processing step of performing hard film processing to the resultant stainless steel plate.

FIGS. 5A and 5B are diagrams showing an example of an electrolytic coloring device used in an electrolytic coloring step of the colored stainless steel plate according to the invention, in which FIG. 5A is an illustration thereof and FIG. 5B is a diagram showing a bath thereof and a periphery thereof.

FIGS. 9A and 9B are diagrams showing a color coating layer surface of the colored stainless steel plate, in which FIG. 9A is a diagram showing a photograph obtained by photographing the color coating layer surface before rolling and FIG. 9B is a diagram showing a photograph obtained by photographing the color coating layer surface after rolling.

DESCRIPTION OF THE EMBODIMENTS

Figure 1:
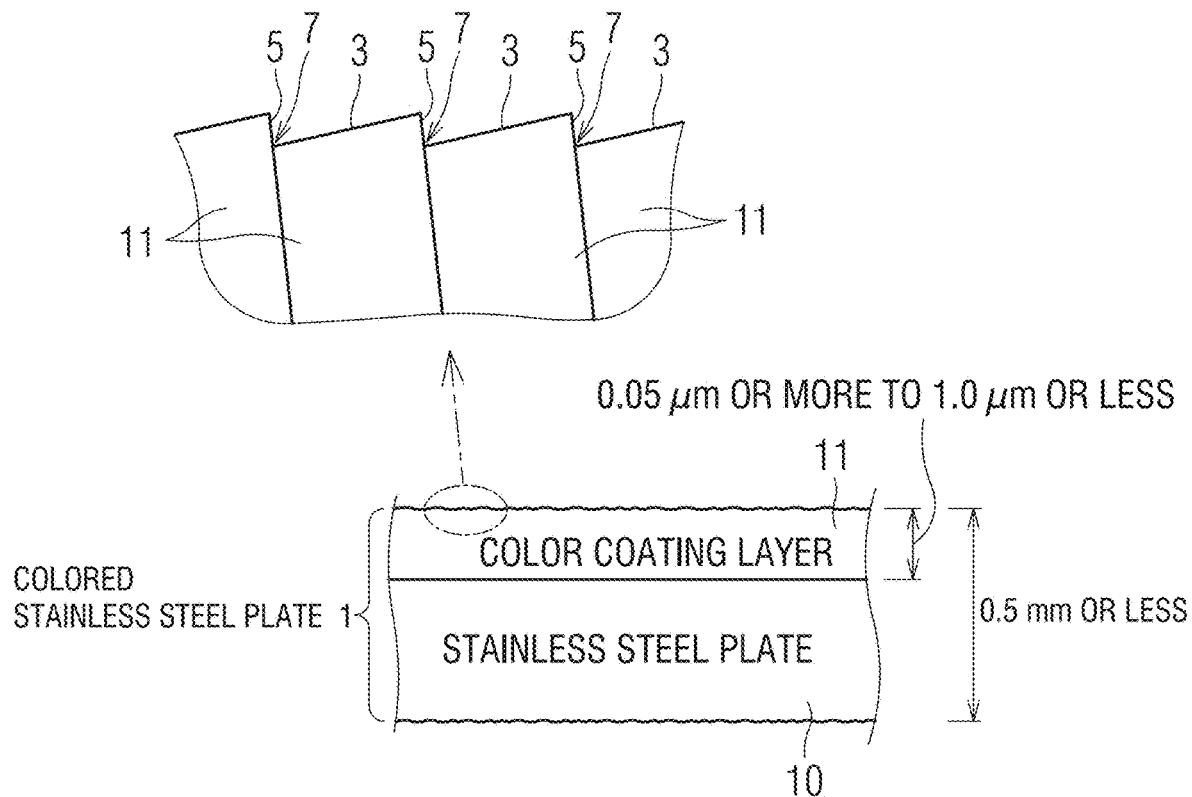
FIG. 1 is a sectional view of an example of a colored stainless steel plate or a colored stainless steel plate according to the invention.

As shown in FIG. 1, a color stainless steel plate 1 according to the invention of the present application has a color coating layer 11 on a surface of a stainless steel plate 10. The total thickness of the color stainless steel plate 1 including the stainless steel plate 10 and the color coating layer 11 is 0.5 mm or less, the thickness of the color coating layer 11 ranges from 0.05 μm or more to 1.0 μm or less, a Vickers hardness Hv on a surface 3 of the color coating layer ranges from 250 or more to 550 or less, a surface roughness of the surface 3 of the color coating layer ranges 0.05 μm or more to 5.0 μm or less as an arithmetic average roughness Ra.

In the colored stainless steel plate 1, a deformed band 5 is formed by plastic deformation performed by cold rolling after coloring. Steps formed on the surface 3 of the color coating layer by the deformed band 5 make a fine unevenness, and recessed portions serve as oil sumps 7. Since oil drops of press forming oil used in press molding after cold rolling are held in the oil sumps 7, oil shortage of press lubricant may be prevented in press working to bring about lubricant effect in press working. The deformed band 5 can be observed as a wave-like striped pattern in an enlarged image obtained by an optical microscope or a scanning electronic microscope.

Figure 2:
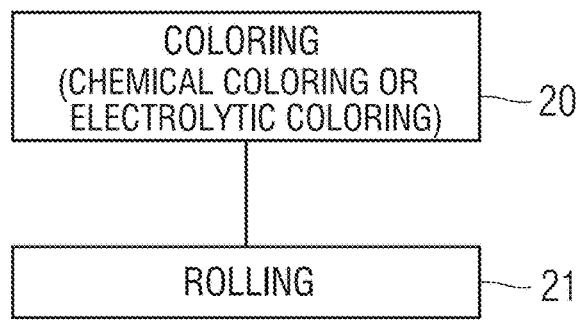
FIG. 2 is a flow chart showing steps in manufacturing the colored stainless steel plate or the colored stainless steel band according to the invention.

The colored stainless steel plate, as shown in FIG. 2, first, a color coating layer is formed on the stainless steel plate surface by a chemical coloring method or an electrolytic coloring method (each of the methods is performed in a batch process). Alternatively, in a colored stainless steel strip serving as an uncut steel plate obtained before the colored stainless steel plate is cut out, on the stainless steel strip surface serving as an uncut steel plate obtained before the stainless steel plate is cut out, a color coating layer is formed by a coil coloring method (continuous coloring method) (coloring step 20). The colored stainless steel plate or the colored stainless steel strip having a thickness of 0.5 mm or less fabricated as described above is rolled by cold rolling (rolling step 21) to manufacture a colored stainless steel plate or a colored stainless steel strip on which a color coating layer is prepared to have a thickness of 0.05 µm or more to 1.0 µm or less. Furthermore, the colored stainless steel strip manufactured as described above is winded (winding step) to manufacture a color stainless steel coil.

As described above, when a color stainless steel plate (including a colored stainless steel strip) or a colored stainless steel coil according to the invention of the present application is to be manufactured, a color coating layer is formed on the stainless steel plate (including stainless steel strip). The color coating layer can be formed by a batch process performed by a chemical coloring method or an electrolytic coloring method when the stainless steel plate is used, and can be formed by a continuous coloring method performed by a coil coloring method when the stainless steel strip is used.

In the chemical coloring method, in an ordinary coloring method onto a stainless steel plate surface, the stainless steel plate is dipped in a high-temperature solution containing a high-concentration bichromate.sulfuric acid for about 10 minutes or more to 1000 minutes or less by a natural dipping method to form an oxide layer.

Figure 3:
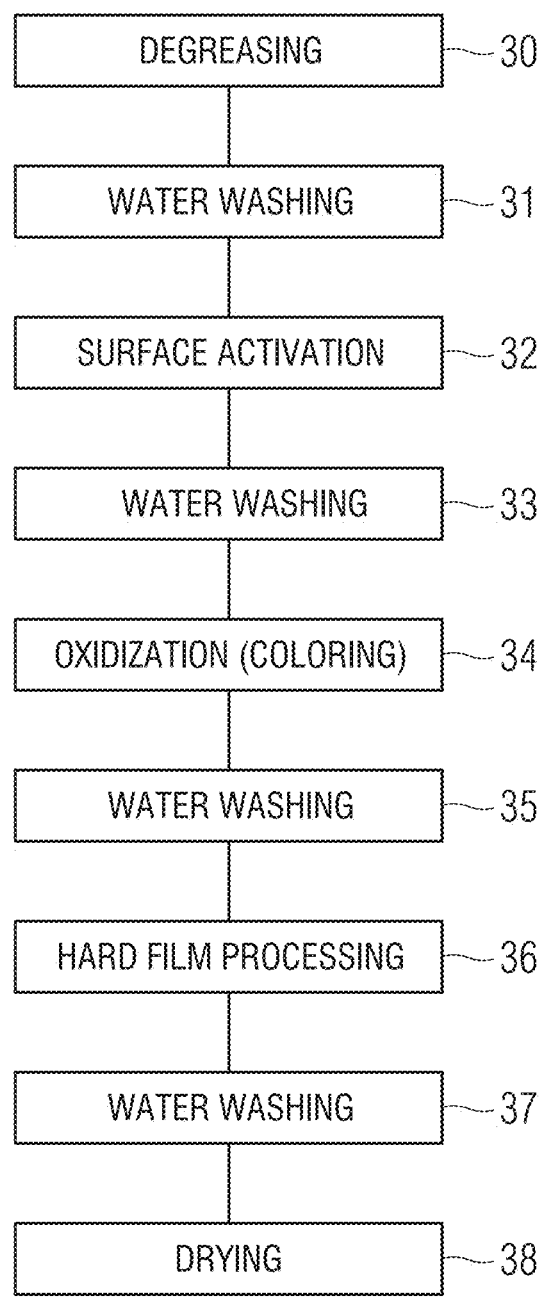
FIG. 3 is a flow chart showing an example of a chemical coloring step of the colored stainless steel plate according to the invention.

The method called an inco (INCO) method, for example, as shown in FIG. 3, includes a degreasing step 30, a water washing step 31, a surface activating step 32, a water washing step 33, an oxidizing (coloring) step 34, a water washing step 35, a hard film processing (drying) step 36, a water washing step 37, and a drying step 38.

Figure 4A:
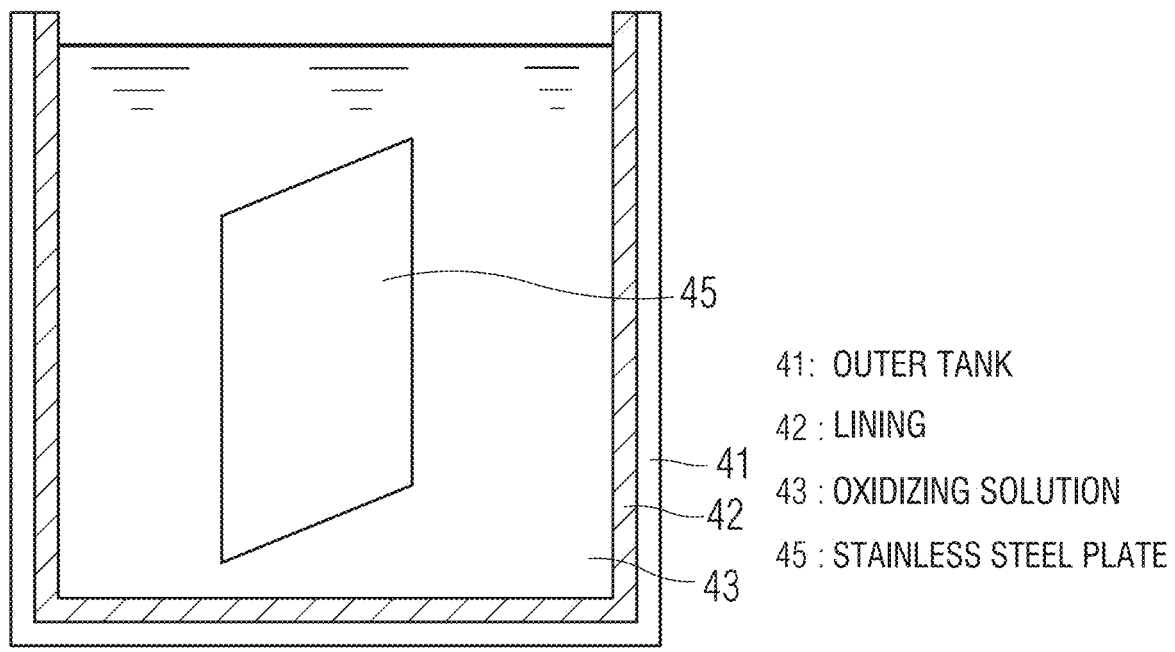
Figure 4B:
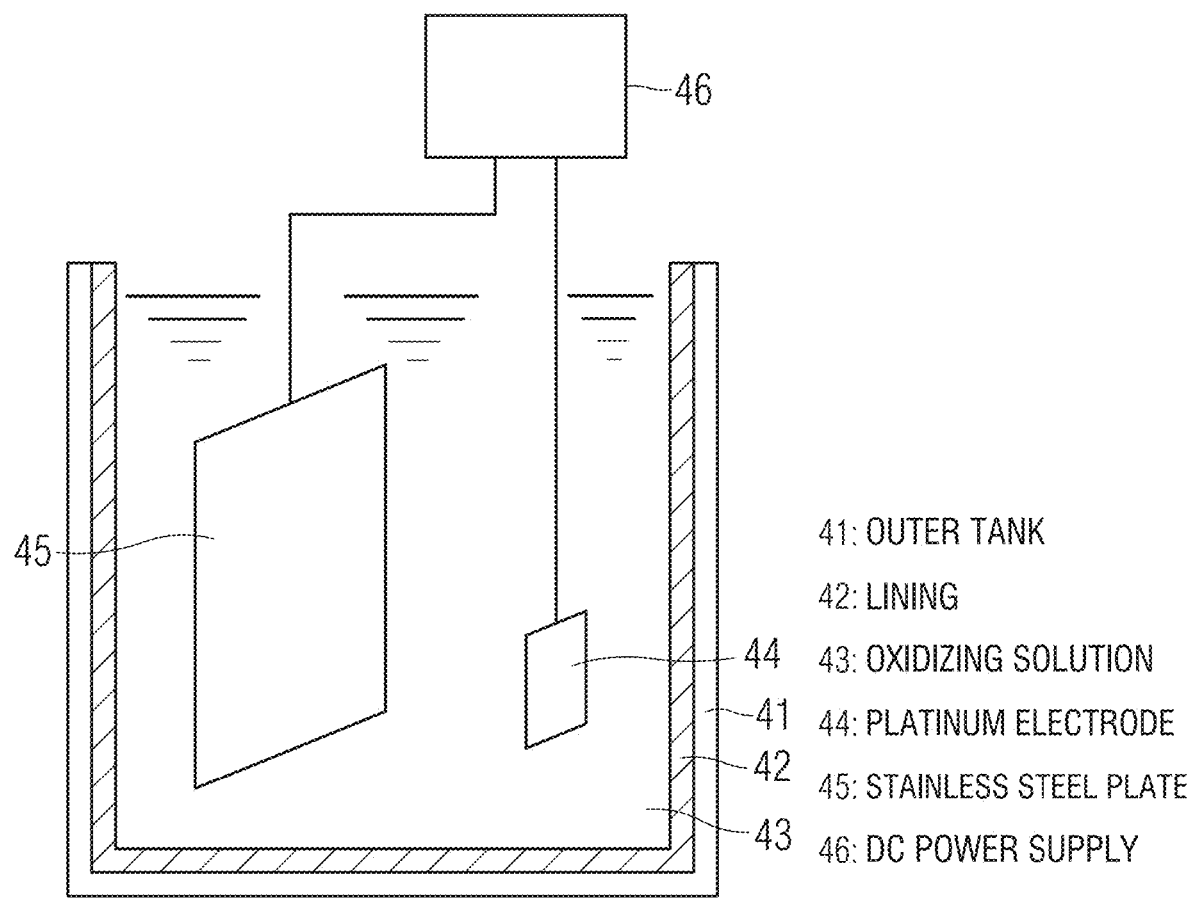

FIGS. 4A and 4B show devices used in the oxidizing (coloring) step 34 and the hard film processing step 36, respectively. More specifically, FIG. 4A shows a chemical coloring device, and FIG. 4B shows a hard film processing device. The chemical coloring device is configured such that a stainless steel plate 45, for example, SUS304 is dipped in an oxidizing solution 43, for example, a solution obtained by dissolving chromium oxide $CrO_3$ serving as a strong oxidant in sulfuric acid, filled in an outer tank 41 lined with a lining 42. The hard film processing device includes a tank similar to the coloring tank of the chemical coloring device, a platinum electrode 44 serving as a counter electrode of the stainless steel plate 45, and a DC power supply 46 applying a potential across the platinum electrode 44 and the stainless steel plate 45.

In chemical coloring, in the degreasing step 30, oil, fat, and the like on the surface of the stainless steel plate 45 are removed by using alkali. In the water washing step 31, the alkali component remaining on the surface of the stainless steel plate 45 is removed by water washing. In the surface activating step 32, the degreased surface of the stainless steel plate 45 is well etched with 10% hydrochloric acid to activate the surface. In the water washing step 33, the hydrochloric acid component remaining on the surface of the stainless steel plate 45 is removed by water washing. In the oxidizing (coloring) step 34, by using the chemical coloring device as shown in FIG. 4A, the stainless steel plate 45 is dipped in 8% chromium oxide $CrO_3$ and a sulfuric acid aqueous solution to oxidize the stainless steel plate 45 at a temperature of 80° C. and a spontaneous potential, i.e., without application of a potential for 5 to 15 minutes depending on the thickness of an oxide layer. In the water washing step 35, the chromium oxide $CrO_3$ component and the sulfuric acid component remaining on the surface of the stainless steel plate 45 are removed by water washing. A hard film processing to improve corrosion resistance of the oxide layer (color coating layer) formed on the surface of the stainless steel plate 45 is performed in the hard film processing step 36. In the hard film processing step 36, a hard film processing device, as shown in FIG. 4B, having a tank similar to that in the oxidizing (coloring) step 34 is used, the stainless steel plate 45 is dipped in 5% chromium oxide $CrO_3$ and phosphoric acid solution, and a potential is applied to the stainless steel plate 45 for 2 to 5 minutes such that a current density of 0.01 A/cm² is obtained at ordinary temperature. In the water washing step 37, the chromium oxide $CrO_3$ component and the phosphoric acid component remaining on the surface of the stainless steel plate 45 are removed by water washing. In the drying step 38, moisture on the surface of the stainless steel 45 is removed to finish all the steps.

Figure 5A:
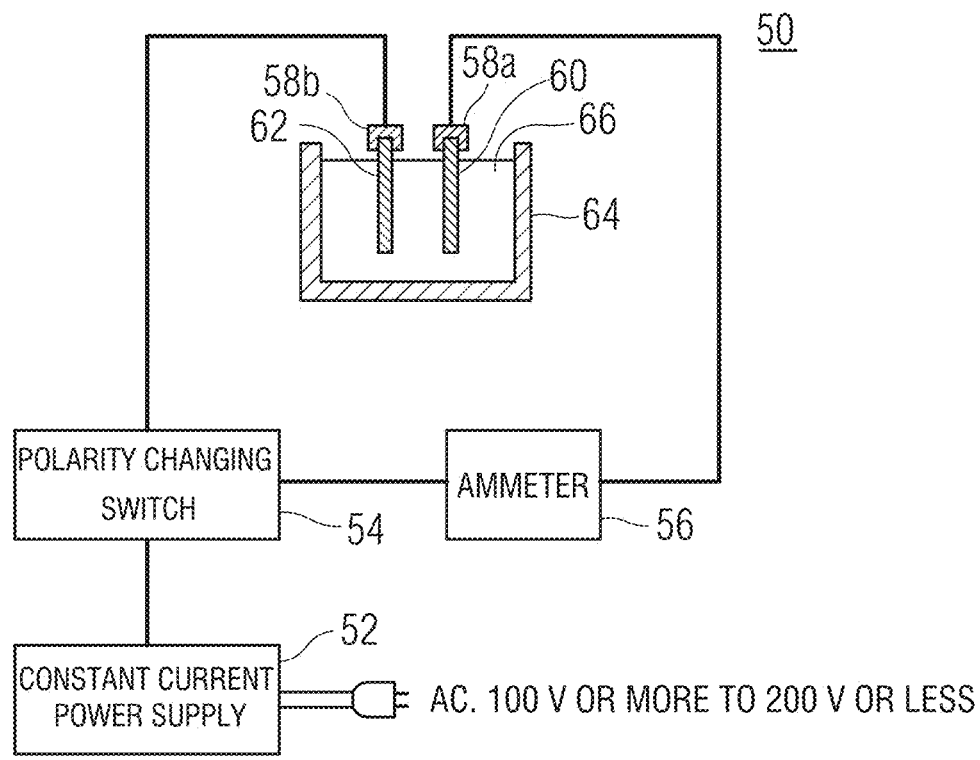
Figure 5B:
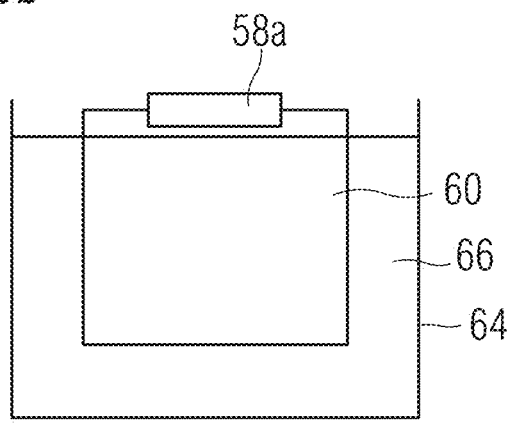

In the electrolytic coloring method, for example, an electrolytic coloring device 50 as shown in FIG. 5 is used. In the electrolytic coloring device 50, in an aqueous solution (liquid temperature of 50 to 90° C.) 66 filled in a bath 64 and obtained by adding chromium oxide $CrO_3$ to a sulfuric acid aqueous solution or sulfuric acid, one output of a polarity changing switch 54 switching the polarities of a constant current power supply 52 is connected to a stainless steel plate 60 by a connecting tool 58a through an ammeter 56, and the other output of the polarity changing switch 54 is connected a counter-electrode plate 62 by a connecting tool 58b. The polarities of the constant current power supply 52 are alternatively switched by the polarity changing switch 54, and anode electrolytic treatment and cathode electrolytic treatment are alternately repeated every 5 seconds. With the treatment, an oxide layer (color coating layer) is formed on the surface of the stainless steel plate 60, and the stainless surface is colored. As the aqueous solution 66, an aqueous solution containing at least one of sodium hydrate and potassium hydrate and having a temperature of 80 to 100° C. may be used.

The above is an example of the case of alternating electrolytic treatment.

When the anode electrolytic treatment is performed as DC electrolytic treatment, the polarity changing switch 54 is fixed to an anode side. Alternatively, the polarity changing switch 54 may be omitted, the positive terminal of the constant current power supply 52 is connected to the stainless steel plate 60 by the connecting tool 58a through the ammeter 56, and the negative terminal of the constant current power supply 52 may be connected to the counter electrode plate 62 by the connecting tool 58b.

When the cathode electrolytic treatment is performed as DC electrolytic treatment, the polarity changing switch 54 is fixed to the cathode side. Alternatively, the polarity changing switch 54 is omitted, the negative terminal of the constant current power supply 52 may be connected to the stainless steel plate 60 by the connecting tool 58a through the ammeter 56, and the positive terminal of the constant current power supply 52 may be connected to the counter-electrode plate 62 by the connecting tool 58b.

The stainless steel plate can create various colors such as bronze, blue, gold, red and green by the colors of an interference film of a color coating layer containing chromium (hydro) oxide having 1.5 µm or less at most as a main component and the colors of the color coating layer itself.

In this manner, the color stainless steel plate colored in the coloring step by the chemical coloring method or the electrolytic coloring method is cold-rolled in a rolling step by, for example, 4-roller rolling machine to form a deformed band. Furthermore, the color stainless steel plate is rolled by a coarsened roll as a final pass to simultaneously coarsen color layer forming surfaces formed on one or two surfaces of the color stainless steel plate.

With the cold rolling after the coloring process, Vickers hardnesses Hv on the front and rear surfaces of the color stainless steel plate increase to 250 or more to 550 or less. The surface roughness of the roll in the final cold-rolling is controlled to make arithmetic average roughnesses Ra on both the surfaces 0.05 μm or more to 5.0 μm or less as surface roughnesses. Recessed portions of fine unevenness obtained by the deformed band 5 serve as the oil sumps 7 of press forming oil used in cold-rolling. Oil drops of press forming oil used in press molding after the cold rolling are held in the oil sumps 7 to prevent oil shortage. In addition, control of the surface roughness on the color surface obtained by coarsening the roll of the final rolling in the cold rolling further reinforces prevention of oil shortage of the press forming oil in the pressing. For this reason, the cold-rolled color stainless steel plate according to the present application is improved in press moldability and galling resistance. As a result, high-volume production capability is also improved.

Figure 6:
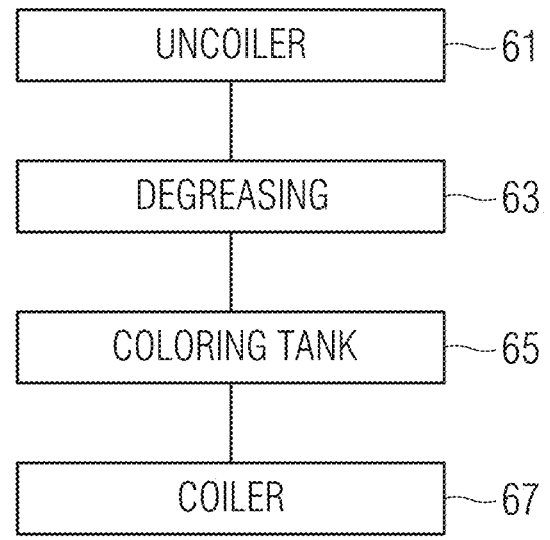
FIG. 6 is a diagram showing an outline of a coil coloring method used in continuous coloring of the colored stainless steel strip according to the invention.

The coil coloring method, for example, as shown in FIG. 6, includes an uncoiler step 61, a degreasing step 63, a coloring tank step 65, and a coiler step 67. First, from a stainless steel coil obtained by winding a stainless steel band in the form of a coil, the stainless steel band is turned out in the uncoiler step 61. An oil film adhering to the surface of the turned-out stainless steel band is removed in the degreasing step 63. Thereafter, the degreased stainless steel band is continuously colored in the coloring tank step 65. The color stainless steel band after the continuous coloring is winded in the form of a coil in the coiler (winding) step 67 to obtain a color stainless steel coil.

Figure 7:
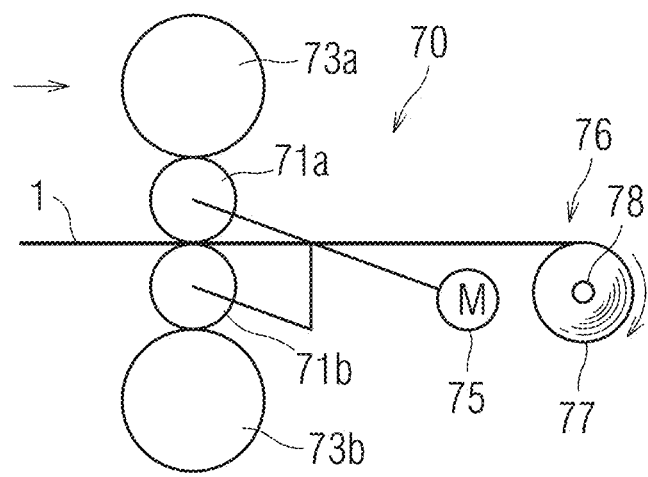
FIG. 7 is a diagram of a 4-roller rolling machine used in a rolling step of the colored stainless steel strip according to the invention.

The colored color stainless steel band is turned out from the color stainless steel coil, and the rolling step is executed. In the rolling step, a color stainless steel band having a color coating layer formed by any one of the coloring methods, for example, a black color coating layer is cold-rolled. In the cold rolling, for example, a 4-roller rolling machine 70 as shown in FIG. 7 or a multistage rolling machine having stages larger than 4 is used. For example, in the 4-roller rolling machine, the color stainless steel band 1 turned out from the color stainless steel coil formed as described above passes between a pair of upper and lower work rolls (drive rolls) 71a and 71b rotationally driven by a motor 75 to perform cold rolling. The pair of upper and lower work rolls (drive rolls) 71a and 71b are supported by a pair of upper and lower backup rolls (non-driving rolls) 73a and 73b, respectively.

FIG. 7 shows one reverse-type 4-roller rolling machine. However, this is merely an example, and cold-rolling in a cluster mill, Sendzimir mill, multistage rolling machine, or the like can be used without a particular problem. A plurality of rolling machines may be serially arranged, and special rolling machine, a special rolling technique, and a special rolling condition are not necessary. When dull rolling is performed, the rolling is performed in only a final pass.

Cold rolling is performed by the 4-roller rolling machine to roll the color stainless steel plate by a coarsened roll as a final pass, thereby forming a deformed band. As a result, the front surface (front surface of the color coating layer) and the rear surface (surface on a side on which the color coating layer of the colored stainless steel strip is not formed) of the colored stainless steel strip are simultaneously coarsened, a thin color stainless steel strip in which the thickness of the color coating layer and the whole thickness are desired thicknesses can be obtained. By cold rolling after the coloring process, the Vickers hardnesses Hv of the front surface and the rear surface of the color stainless steel band increase to 250 or more to 550 or less. In addition, a fine unevenness having an arithmetic average roughness Ra of 0.05 μm or more to 5.0 μm or less as a surface roughness is observed on each of the front and rear surfaces of the colored stainless steel strip. Recessed portions of the fine unevenness obtained by the deformed band 5 serve as the oil sumps 7 of press forming oil used in cold rolling to prevent oil shortage, so that the color stainless steel band is improved in press moldability and galling resistance. As a result, high-volume production capability is also improved.

Furthermore, the colored stainless steel strip cold-rolled by the 4-roller rolling machine 70 is winded on, for example, an iron core 78 by the coiler device 76 in the form of a coil (winding step) to obtain a color stainless steel coil 77.

After the cold rolling, a correction process such as a leveler, a tension leveler, or tension annealing for the color stainless steel plate or the colored stainless steel strip may be necessary. These correction processes do not spoil the effect of the invention of the present application, and is included in the scope of rights of the invention of the present application.

In the above explanation, the colored stainless steel plate obtained after the continuous coloring is temporarily winded in the form of a coil to form a colored stainless steel coil. Thereafter, the colored stainless steel strip is turned out from the colored stainless steel coil and then winded in the form of a coil again after cold rolling is executed, so that a color stainless steel coil is formed. However, a continuously colored color stainless steel band may be immediately cold-rolled, and the cold-rolled colored stainless steel strip may be winded in the form of a coil to form a colored stainless steel coil. Each of the series of processes does not spoil the effect of the invention of the present application, and is included in the scope of rights of the invention of the present application.

EMBODIMENTS

By using steel plates of SUS304, SUS316, and SUS443J1, chemical coloring processes were performed under conditions shown in Table 1A. Electrolytic coloring processes were performed under conditions shown in Table 1B and Table 1C. As thicknesses of color coating layers, color coating thicknesses were adjusted by changing coloring process times. The thicknesses of the color coating layers were measured by sputtering performed by a high-frequency glow discharge emission surface analyzing device (GD-Profiler2 available from Horiba, Ltd.). In hardness measurement, with respect to a steel plate surface, an average of Vickers hardnesses at 5 points was measured by using a hardness measurement device (FM-ARS900 available from FUTURE-TECH CORP.), and a measurement load was set to 50 g. With respect to a surface roughness, an average of arithmetic average roughnesses Ra at 5 points was measured by using a surface roughness measurement device (HANDYSURF E-35A available from Tokyo Seimitsu Co., Ltd.).

TABLE 1A

| Coloring condition | Coloring method | Chemical solution | Chemical coloring condition | |
|---|---|---|---|---|
| | | | Temperature (° C.) | Reaction time (min.) |
| Condition 1 | Chemical coloring | $CrO_3$ 250 g/L $H_2SO_4$ 500 g/L Aqueous solution | 50-100 | 10-120 |

TABLE 1B

| Coloring condition | Coloring method | Polarity | Chemical solution | Chemical solution temperature | Anode current density (A/dm$^2$) | Cathode current density (A/dm$^2$) |
|---|---|---|---|---|---|---|
| Condition 2 | Anode electrolytic | DC | $H_2SO_4$ 500 g/L Aqueous solution | 50-90° C. | 0.04 | — |
| Condition 3 | Anode electrolytic | DC | $CrO_3$ 250 g/L $H_2SO_4$ 500 g/L Aqueous solution | 50-90° C. | — | 0.01-0.5 |

TABLE 1C

| Coloring condition | Coloring method | Polarity | Chemical solution | Chemical solution temperature | Anode current density (A/dm$^2$) | Anode energization time per unit alternating cycle (sec.) | Cathode current density (A/dm$^2$) | Cathode energization time per unit alternating cycle (sec.) |
|---|---|---|---|---|---|---|---|---|
| Condition 4 | Alternating electrolytic | Alternating | $H_2SO_4$ 500 g/L Aqueous solution | 50-90° C. | 0.2-0.5 | 0.1-15 | 0.2-0.5 | 0.1-15 |
| Condition 5 | Alternating electrolytic | Alternating | $CrO_3$ 250 g/L $H_2SO_4$ 500 g/L Aqueous solution | 50-90° C. | 0.1-0.3 | 0.1-15 | 0.2-0.4 | 0.1-15 |
| Condition 6 | Alternating electrolytic | Alternating | NaOH 40 g/L Aqueous solution | 50-90° C. | 1.0 | 5 | 1.0 | 10 |

Experimental Example 1

Coloring processes were performed to steel plates of a BA material and a ½H material of SUS304 each having a thickness of 0.3 mm and 200-mm width×300-mm length under the conditions shown in Table 1A, Table 1B, and Table 1C. Thereafter, by using a small 4-roller rolling machine in a laboratory, reverse-type multi-pass cold rolling was performed to the steel plates to obtain 0.2-mm thicknesses at room temperature. On the other hand, by using steel plates of a BA material and a ½H material of SUS304 each having a thickness of 0.3 mm, cold rolling was laboratorily performed to obtain 0.2-mm thicknesses. Thereafter, coloring was performed under the condition in Table 1.

As a galling resistance test evaluation method, a cylindrical swift deep drawing test was performed. In this case, a punch diameter was set to 40 mm, a punch progressing rate was set to 60 mm/min, a blank holding force was set to 12 kN, and blank diameters are changed into 72 mm, 78 mm, and 84 mm to perform the test. In order to easily detect a seizure difference, low-viscosity press forming oil (viscosity of 25 centistokes) was applied to perform the test, and the presence/absence of galling or the like was examined.

Table 2 shows results of cylindrical swift deep drawing tests for the BA material and the ½H material of SUS304. In Table 2, with respect to galling characteristics, a material which is not galled in the cylindrical swift deep drawing test is indicated by "○", and a material which is galled is indicated by "x". In Table 2, with respect press moldability, as a result of the cylindrical swift deep drawing test, a material which can perfectly pass drawing-out processing and is not cracked is indicated by "⊚". In addition, a material which can perfectly pass drawing-out processing but is cracked at a punch corner portion is indicated by "○". Furthermore, a material which is cracked in the middle of drawing-out processing and cannot pass the drawing-out processing is indicated by "x".

In Table 2, an example in which the thickness of a color coating layer falls within the range of 0.05 μm or more to 1.0 μm or less and cold rolling is performed after a coloring process is used as the example. On the other hand, an example in which the thickness of a color coating layer falls outside the range of 0.05 μm or more to 1.0 μm or less or an example in which the thickness falls within the range and a coloring process is performed after cold rolling is used as a comparative example.

TABLE 2

| | Steel type | Cold-rolling method | Vickers hardness Hv | Coloring method | Coloring condition | Thickness of color coating layer (μm) | Arithmetic average roughness (Ra · μm) |
|---|---|---|---|---|---|---|---|
| Comparative example | SUS304 BA material | Cold rolling after coloring process | 450 | Electrolytic coloring | Condition 4 | 0.04 | 0.02 |
| Comparative example | | | | Chemical coloring | Condition 1 | 0.04 | 0.03 |
| Example | | | | Electrolytic coloring | Condition 2 | 0.05 | 0.03 |
| Example | | | | Electrolytic coloring | Condition 3 | 0.12 | 0.02 |
| Example | | | | Chemical coloring | Condition 1 | 0.13 | 0.03 |
| Example | | | | Electrolytic coloring | Condition 6 | 0.35 | 0.02 |
| Example | | | | Electrolytic coloring | Condition 5 | 0.52 | 0.03 |
| Example | | | | Electrolytic coloring | Condition 5 | 0.84 | 0.02 |
| Example | | | | Electrolytic coloring | Condition 5 | 0.95 | 0.02 |
| Comparative example | | | | Electrolytic coloring | Condition 5 | 1.05 | 0.02 |
| Comparative example | | Coloring process after cold rolling | 452 | Electrolytic coloring | Condition 5 | 0.04 | 0.03 |
| | | | | Electrolytic coloring | Condition 6 | 0.10 | 0.03 |
| | | | | Electrolytic coloring | Condition 5 | 0.55 | 0.02 |
| Comparative example | SUS304 1/2H material | Cold rolling after coloring process | 520 | Chemical coloring | Condition 1 | 0.04 | 0.02 |
| Example | | | | Chemical coloring | Condition 1 | 0.06 | 0.02 |
| | | | | Electrolytic coloring | Condition 4 | 0.15 | 0.03 |
| | | | | Electrolytic coloring | Condition 4 | 0.45 | 0.03 |
| Comparative example | | Coloring process after cold rolling | 523 | Electrolytic coloring | Condition 3 | 0.04 | 0.02 |
| | | | | Electrolytic coloring | Condition 3 | 0.07 | 0.02 |
| | | | | Electrolytic coloring | Condition 3 | 0.14 | 0.02 |

| | Blank diameter (mm) | | | | | |
|---|---|---|---|---|---|---|
| | 72 | | 78 | | 84 | |
| | Galling characteristics | Press moldability | Galling characteristics | Press moldability | Galling characteristics | Press moldability |
| Comparative example | X | X | X | X | X | X |
| Comparative example | X | X | X | X | X | X |
| Example | ○ | ○ | ○ | ○ | ○ | ○ |
| Example | ○ | ◎ | ○ | ◎ | ○ | ◎ |
| Example | ○ | ◎ | ○ | ◎ | ○ | ◎ |
| Example | ○ | ◎ | ○ | ◎ | ○ | ◎ |
| Example | ○ | ◎ | ○ | ◎ | ○ | ◎ |
| Example | ○ | ◎ | ○ | ◎ | ○ | ◎ |
| Example | ○ | ◎ | ○ | ◎ | ○ | ◎ |
| Comparative example | X | X | X | X | X | X |
| Comparative example | X | X | X | X | X | X |
| | ○ | ◎ | ○ | X | ○ | X |
| | ○ | ◎ | ○ | X | ○ | X |
| Comparative example | X | X | X | X | X | X |
| Example | ○ | ○ | ○ | ○ | ○ | ○ |
| | ○ | ◎ | ○ | ◎ | ○ | ○ |
| | ○ | ◎ | ○ | ◎ | ○ | ○ |
| Comparative example | X | X | X | X | X | X |
| | ○ | ○ | ○ | X | X | X |
| | ○ | ○ | ○ | X | X | X |

In this experiment, a limiting drawing ratio is small because low-viscosity press forming oil is used. On the other hand, in Comparative example, it is clarified that, when the thickness of the color coating layer is less than 0.05 μm, galling occurs at a punch corner portion by seizure between the stainless steel plate and a press mold to deteriorate press moldability. In contrast to this, in the embodiments of the present invention, any galling was not observed. In addition, even though a blank diameter increases to make the press moldability severe, the press moldability and the deep drawing characteristics are considerably preferable more than those of Comparative example in which coloring is performed after cold rolling.

Experimental Example 2

By using steel plates of a BA material having a 0.3-mm thickness of SUS316 and SUS443J1, electrolytic coloring was performed under conditions in Table 1, and the thicknesses of color coating layers were also changed. Thereafter, multi-pass cold rolling was performed to laboratorily obtain a 0.2-mm thickness. In the final pass of cold rolling, steel plates in which surface roughnesses of roll surfaces were changed at 8 levels by shot blast or electrolytic etching were used, and arithmetic average roughnesses Ra on the surfaces of color coating layers of cold-rolled color stainless steel plates were changed. Press moldabilities were evaluated by using these steel plates. A cylindrical swift deep drawing test was performed as a press moldability test to calculate a limiting drawing ratio. In this case, low-viscosity press forming oil (viscosity of 25 centistokes) was used, a punch diameter was set to 40 mm, a punch progress rate was set to 60 mm/min, a blank holding force was changed within the range of 12 kN or more to 20 kN or less, and a blank diameter was changed within the range of 60 mm or more to 100 mm or less to perform the test.

In a deep drawing test, a ratio of blank diameter/punch diameter serves as a drawing ratio, and a limit value at which the steel plate can be drawn without being broken is a limiting drawing ratio. Since the punch diameter is constant, when the blank diameter increases, deep drawing becomes difficult. As a matter of course, when the limiting drawing ratio is high, deep drawing characteristics are good.

These results are shown in Table 3. With respect to galling resistance, a color coating layer having a layer thickness of 0.05 μm or more is effective. However, it is clear that, when the arithmetic average roughness Ra falls within the range of the scope of claims of the present invention, each of the steel types has a very high limiting drawing ratio.

In this Table 3, an example in which the thickness of a color coating layer falls within the range of 0.05 μm or more to 1.0 μm or less and an arithmetic average roughness is 0.05 μm or more to 5.0 μm or less is used as the example. In contrast to this, an example in which the thickness of a color coating layer falls outside the range of 0.05 μm or more to 1.0 μm or less or an arithmetic average roughness falls outside the range of 0.05 μm or more to 5.0 μm or less is used as the comparative example.

TABLE 3

| | Steel type | Hv | Thickness of color coating layer | Arithmetic average roughness of surface, Ra (μm) | Limiting drawing ratio | Presence/absence of galling |
|---|---|---|---|---|---|---|
| Comparative example | SUS316 | 349 | 0.04 | 0.03 | 1.70 | Presence |
| Comparative example | | | 0.06 | 0.04 | 1.75 | Absence |
| Example | | | 0.05 | 0.11 | 1.95 | Absence |
| Example | | | 0.15 | 0.04 | 1.90 | Absence |
| Example | | | 0.16 | 0.15 | 2.00 | Absence |
| Example | | | 0.25 | 0.56 | 2.05 | Absence |
| Example | | | 0.26 | 4.8 | 2.00 | Absence |
| Comparative example | | | 0.21 | 5.5 | 1.75 | Absence |
| Comparative example | SUS443J1 | 275 | 0.04 | 0.04 | 1.75 | Presence |
| Example | | | 0.09 | 0.15 | 1.95 | Absence |
| Example | | | 0.21 | 0.60 | 2.05 | Absence |
| Example | | | 0.26 | 1.50 | 2.10 | Absence |
| Example | | | 0.23 | 4.90 | 2.05 | Absence |
| Comparative example | | | 0.28 | 5.05 | 1.85 | Absence |

Experimental Example 3

A steel band (about 300 kg) of a BA material having a width of 320 mm and a thickness of 0.3 mm of SUS304 was divided by four divided steel strips, and two of the four divided steel strips were electrolytically colored under the conditions in Table 4 and had color coating layers having thicknesses set at two levels. Cold rolling was performed by using a 4-roller rolling machine (work roll diameter of 80 mm), and the surface roughness of the roll in the final pass was adjusted to obtain a steel plate having a thickness of 0.2 mm. On the other hand, the remaining two of the four divided steel strips were cold-rolled in the same manner as described above to form steel strips having two levels of surface roughnesses and electrolytically colored under the conditions in Table 4 to obtain two levels of color coating layer thicknesses. As evaluation of press moldability and galling, the same cylindrical swift deep drawing test as in Experimental Example 2 was performed to calculate a limiting drawing ratio, so that the presence/absence of galling was checked.

TABLE 4

| Coloring method | Polarity | Chemical solution | Anode current density (A/dm²) | Anode energization time per unit alternating cycle (sec.) | Cathode current density (A/dm²) | Cathode energization time per unit cycle (sec.) | Total energization process time (min.) |
|---|---|---|---|---|---|---|---|
| Alternating electrolyte | Alternating | H₂SO₄ 500 g/L Aqueous solution | 0.2-0.5 | 0.1-15 | 0.2-0.5 | 0.1-15 | 5-60 |

These results are shown in Table 5. In this Table 5, an example in which the thickness of a color coating layer falls within the range of 0.05 μm or more to 1.0 μm or less and cold rolling is performed after a coloring process is used as the example. An example in which the thickness of a color coating layer falls outside the range of 0.05 μm or more to 1.0 μm or less or an example in which the thickness falls within the range and a coloring process is performed after cold rolling is used as the comparative example.

In Comparative Example 3-1 in which the layer thickness of the color coating layer is small, galling occurs. In Comparative Example 3-2 in which coloring is performed after cold rolling, galling does not occur because the layer thickness of the color coating layer is sufficient. However, when the arithmetic average roughness is adjusted within the range of the scope of claims, a limiting drawing ratio is somewhat improved. The limiting drawing ratio is low as in Comparative Example 3-1. On the other hand, in each of Examples 3-1 and 3-2, galling does not occur. It is understood that the limiting drawing ratio in Example 3-2 in which the arithmetic average roughness is adjusted within the range of the scope of claims is very high.

TABLE 5

| | Cold rolling method | Thickness of color coating layer (μm) | Arithmetic average roughness Ra (μm) | Hv | Limiting drawing ratio | Galling |
|---|---|---|---|---|---|---|
| Comparative example 3-1 | Coloring process after cold rolling | 0.04 | 0.04 | 425 | 1.75 | Presence |
| Comparative example 3-2 | Coloring process after cold rolling | 0.25 | 0.55 | 430 | 1.85 | Absence |
| Example 3-1 | Cold rolling after coloring process | 0.16 | 0.03 | 440 | 2.05 | Absence |
| Example 3-2 | Cold rolling after coloring process | 0.41 | 0.46 | 435 | 2.20 | Absence |

Experimental Example 4

Figure 8A:
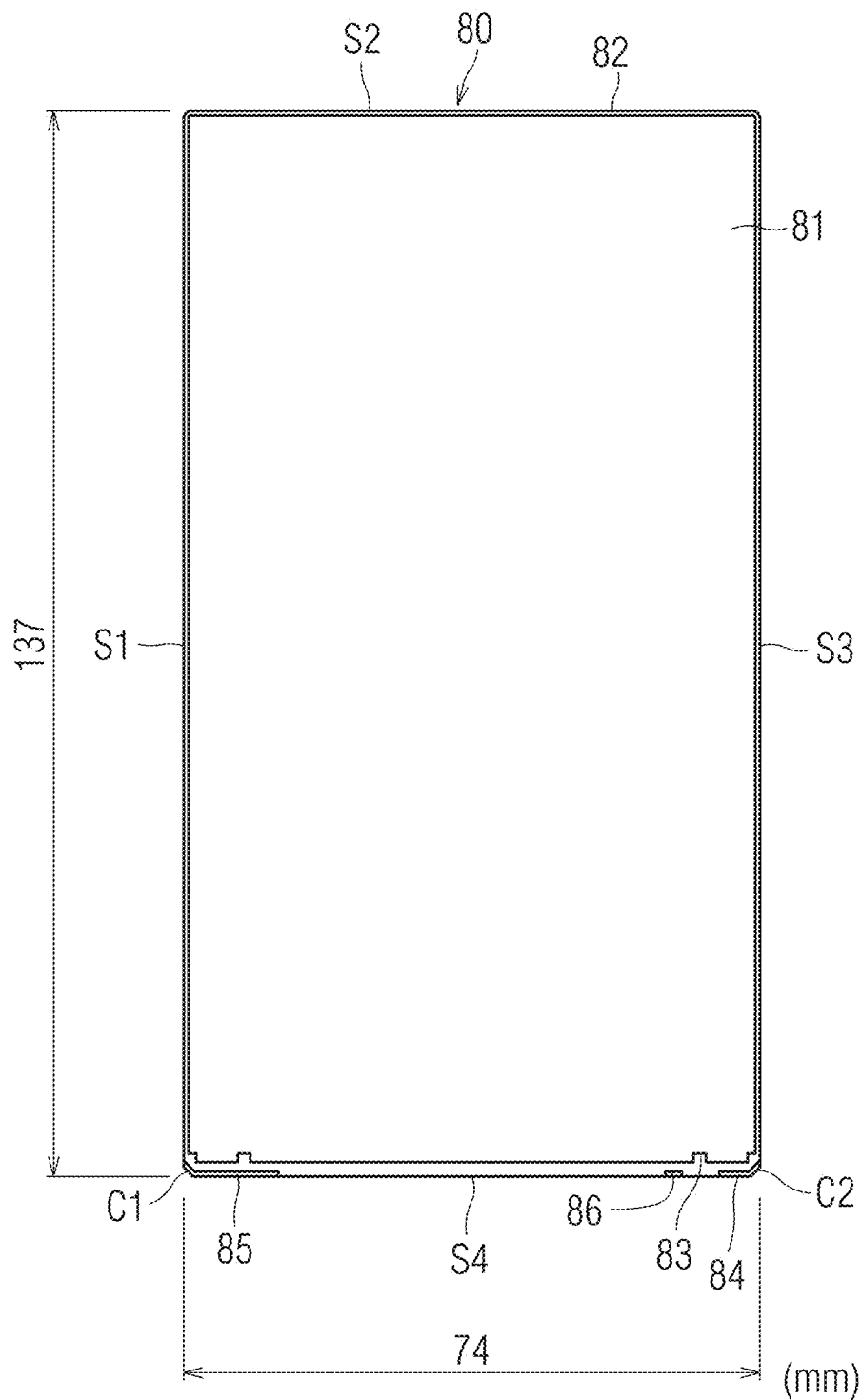
FIG. 8A is a plan view of a vessel of a smart phone serving as an example using the colored stainless steel plate according to the invention.
Figure 8B:
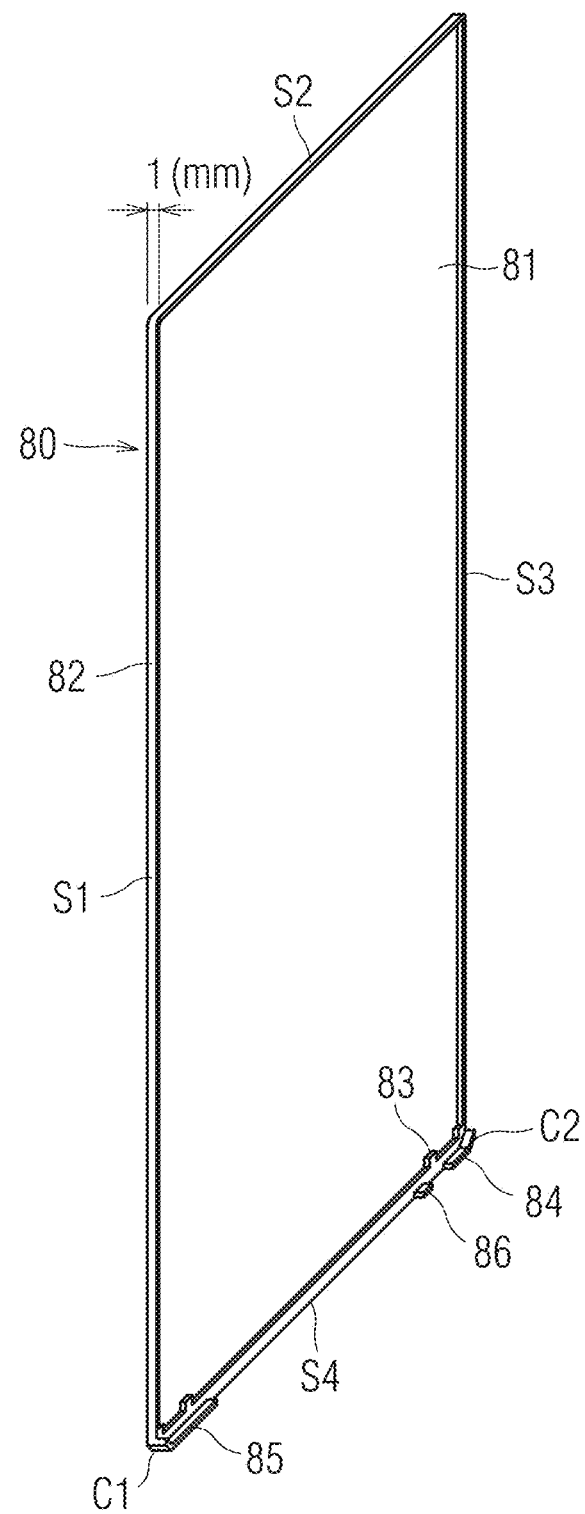
FIG. 8B is a perspective view of the vessel of the smart phone serving as an example using the colored stainless steel plate according to the invention.
Figure 9A:
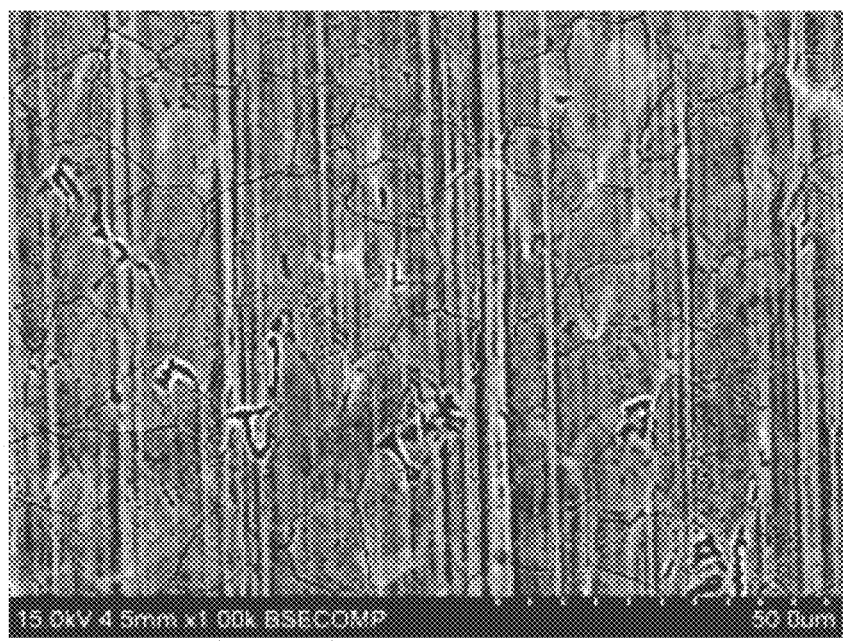
Figure 9B:
Figure 10:
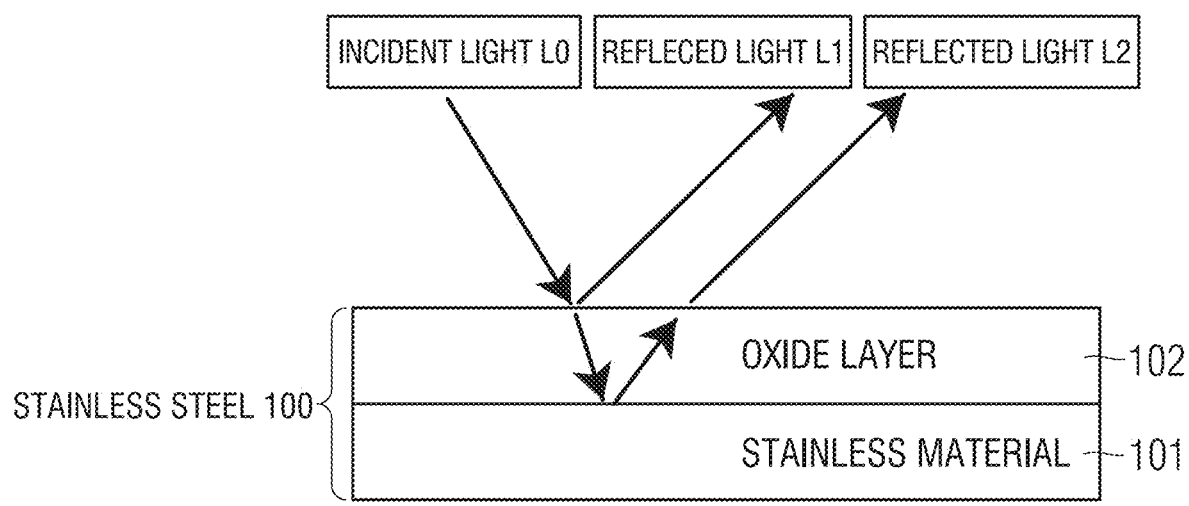
FIG. 10 is a diagram showing a coloring principle of stainless steel.
Figure 11:
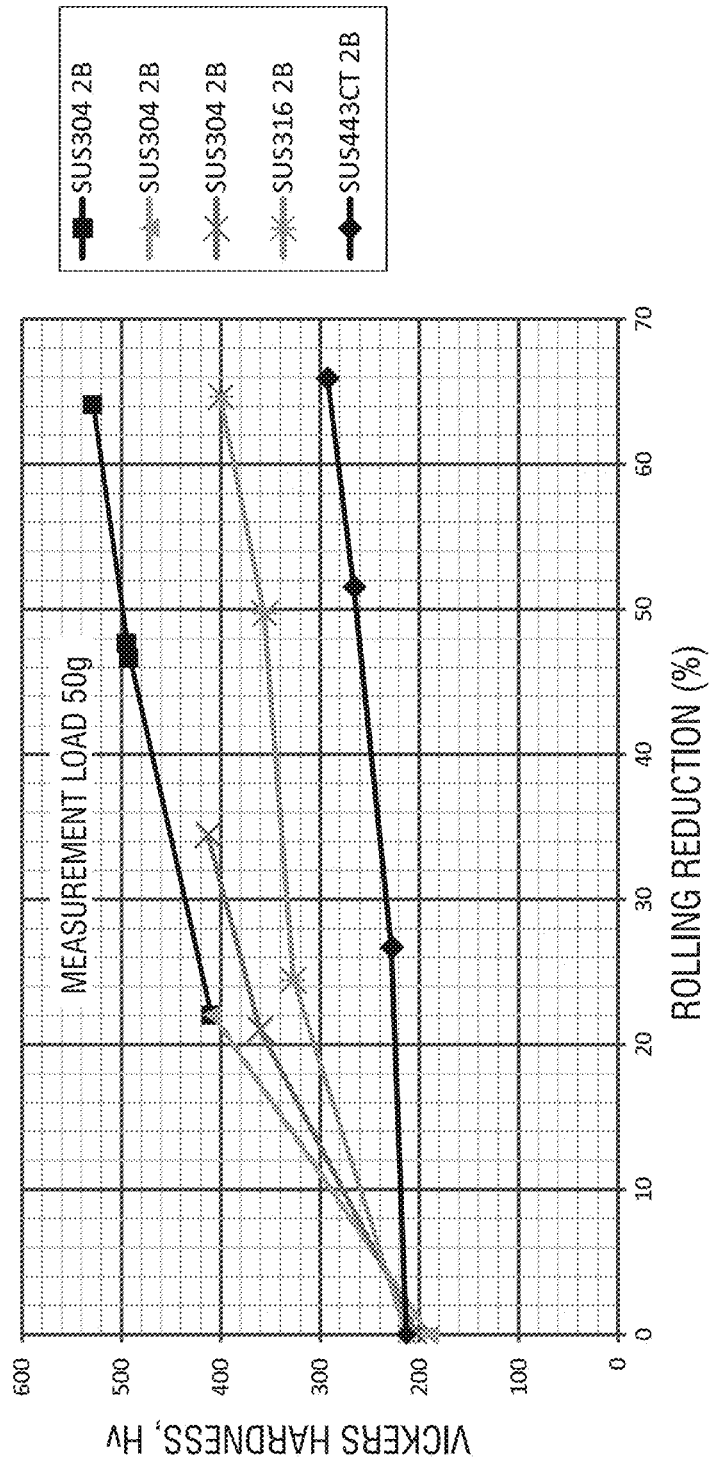
FIG. 11 is a diagram showing a relationship between a hardness and a rolling rate of stainless steel.

A vessel for smart phone was manufactured by way of trial by using Example 3-2 in Table 5. FIG. 8A and FIG. 8B are diagrams showing a trial product of the vessel for smart phone. In the drawings, a vessel 80 has, for example, has an approximately rectangular base 81 having a height of 137 mm, a width of 74 mm, and a rising (thickness) of 1 mm. Three peripheral edges 82 including long sides S1 and S3 of the base 81 and one short side S2 adjacent to the long sides form a narrow-frame shape bent to slightly protrude in vertical directions to the main surface of the base 81. A peripheral edge 83 of the remaining short side S4 of the base 81 corresponds to the bottom surface of the smart phone. The peripheral edge 83 has a large width unlike the narrow-frame shape of the peripheral edges 82. Corner portions C1 and C2 of the base 81 are cutouts cut at 45 degrees. Support portions 84 and 85 near the corner portions and a support portion 86 formed at a position slightly distant from the support portion 84 is wider and higher than the peripheral edge 82. This shape is a shape suitable for engagement with the smart phone body.

As described above, the vessel for smart phone, unlike a building material required to have surface flatness, is required to satisfy both a small thickness and high strength. Even in the vessel for smart phone can be achieved by press working of a colored stainless steel plate. At this time, according to the manufacturing method, galling does not easily occur, and press moldability is also improved. For this reason, even though the shape near the corner portion is complicated, working can be performed without deteriorating productivity. In addition, a vessel colored in a color except for black can be achieved by changing the thickness of the color coating layer.

A stainless steel plate having a thickness of 0.5 mm or more can also be coarsened and colored.

As described above, although the embodiment of the present invention is disclosed in the above description, the present invention is not limited to the embodiment.

More specifically, the embodiment as described above can be variously changed with respect to mechanisms, shapes, materials, quantities, positions, arrangements, and the like without departing from the technical idea and the scope of the present invention, and these changes are included in the present invention.

For example, a colored stainless steel plate according to another embodiment of the invention of the present application is a colored stainless steel plate including a stainless steel plate having at least one main surface to be colored and a color coating layer formed on the main surface to be colored of the stainless steel plate, wherein the colored stainless steel plate is a plastic deformed laminated body in which main surfaces are adjusted in hardness by plastic deformation performed by cold rolling to control the hardness of at least one main surface and the thickness of the color coating layer, and fine unevenness serving as oil sumps of press forming oil is formed on at least one main surface by the cold rolling.

The fine unevenness is formed by coarsening at least one main surface of the plastic deformed laminated body by the cold rolling.

The coarsening is performed such that a deformed band formed in the plastic deformed laminated body by cold molding forms steps in at least one main surface of the plastic deformed laminated body.

Furthermore, the deformed band is formed such that the cold rolling is executed to the plastic deformation laminated body by a mill roll having a coarsened surface.

INDUSTRIAL APPLICABILITY

A color stainless steel plate, a color stainless steel coil, and a method of manufacturing the same according to the invention are used in press products press-molded by molds in an application of molded articles requiring high strength and high rigidity of thin color stainless. According to the invention, since a color cold-rolled thin stainless steel plate or thin steel band which does not easily cause galling and is excellent in press moldability can be obtained, the life time of a press mold or the like and productivity are improved to considerably contribute to metal working industry segments.

REFERENCE NUMERALS 1 colored stainless steel plate
3 surface of color coating layer
5 deformed band
7 oil sump
10 stainless steel plate
11 color coating layer
20 coloring step
21 rolling step
30 degreasing step
31, 33, 35, 37 water washing step
32 surface activating step
34 oxidizing step
36 hard film processing step
38 drying step
41 outer tank
42 lining
43 oxidizing solution
44 platinum electrode
45 stainless steel plate
46 DC power supply
50 electrolytic coloring device
52 constant current power supply
54 polarity changing switch
56 ammeter
58a, 58b connecting tool
60 stainless steel plate
61 uncoiler step
62 counter-electrode plate
63 degreasing step
64 bath
65 coloring tank step
66 aqueous solution
67 coiler step
70 four-roller rolling machine
71a, 71b work roll
73a, 73b backup roll
75 motor
76 coiler device
77 colored stainless steel coil
78 core
80 vessel
81 base
82, 83 peripheral edge
84, 85, 86 support portion
100 stainless steel
101 stainless material
102 oxide layer
S1, S3 long side
S2, S4 short side
C1, C2 corner portion

What is claimed is:

1. A colored stainless steel plate, comprising:
a stainless steel plate; and
a color coating layer on the stainless steel plate having a thickness in a range of 0.05 μm to 1.0 μm, wherein
a total thickness of the stainless steel plate and the color coating layer is equal to or less 0.5 mm,
the color coating layer is formed by a hydro oxide of chromium, and
the color coating layer has a Vickers hardness Hv in a range of 250 to 550.

2. A colored stainless steel coil obtained by winding the colored stainless steel plate according to claim 1 in the form of a coil.

3. The colored stainless steel plate according to claim 1, wherein the color coating layer has an arithmetic average roughness Ra in a range of 0.05 μm to 5.0 μm.

4. A colored stainless steel coil obtained by winding the colored stainless steel plate according to claim 3 in the form of a coil.

5. A colored stainless steel plate, comprising:
a stainless steel plate; and
a color coating layer on the stainless steel plate having a thickness in a range of 0.05 μm to 1.0 μm, wherein
a total thickness of the stainless steel plate and the color coating layer is equal to or less 0.5 mm,
the color coating layer is formed by a hydro oxide of chromium, and
the color coating layer has a deformed band formed on a surface of the color coating layer by cold rolling, the deformed band having a wave-like striped pattern that is observable by an optical microscope or a scanning electron microscope.

* * * * *